(12) United States Patent
Pignato

(10) Patent No.: US 11,043,795 B2
(45) Date of Patent: Jun. 22, 2021

(54) IRRIGATION CONTROL WIRING SYSTEM

(71) Applicant: TurfCircuits, LLC, Royal Palm Beach, FL (US)

(72) Inventor: Michael Pignato, Royal Palm Beach, FL (US)

(73) Assignee: TURFCIRCUITS, LLC, Royal Palm Beach, FL (US)

( * ) Notice: Subject to any disclaimer, the term of this patent is extended or adjusted under 35 U.S.C. 154(b) by 409 days.

(21) Appl. No.: 16/188,177

(22) Filed: Nov. 12, 2018

(65) Prior Publication Data

US 2019/0148925 A1    May 16, 2019

Related U.S. Application Data

(60) Provisional application No. 62/584,410, filed on Nov. 10, 2017.

(51) Int. Cl.
*H02G 3/08* (2006.01)
*H02G 9/00* (2006.01)
(Continued)

(52) U.S. Cl.
CPC ............. *H02G 3/083* (2013.01); *A01G 25/16* (2013.01); *H02G 9/00* (2013.01); *A01G 25/00* (2013.01); *H01R 9/223* (2013.01); *H01R 9/24* (2013.01); *H02G 3/088* (2013.01); *H02G 9/02* (2013.01); *H02G 9/10* (2013.01)

(58) Field of Classification Search
CPC .......... H02G 3/08; H02G 3/081; H02G 3/083; H02G 3/088; H02G 9/00; H02G 3/14; H01R 9/22; H01R 9/24; H01R 9/2408; H01R 9/223; H01R 9/00; H05K 5/00; H05K 5/02; H05K 5/0217; H05K 5/0247; H05K 5/03; A01G 25/16; A01G 25/162
USPC ......... 174/50, 53, 57, 58, 520, 59, 535, 559, 174/560, 66, 67, 17 R; 220/3.2–3.9, 4.02, 220/241, 242; 361/600, 601, 602, 622, 361/627, 641, 679.01
See application file for complete search history.

(56) References Cited

U.S. PATENT DOCUMENTS 5,853,302 A * 12/1998 Roman ................ H01R 9/2425
439/629
7,289,886 B1 * 10/2007 Woytowitz ........... A01G 25/165
239/69

(Continued)

*Primary Examiner* — Angel R Estrada
(74) *Attorney, Agent, or Firm* — Steven M. Greenberg, Esq.; Shutts & Bowen LLP

(57) ABSTRACT

An irrigation control wiring system includes an irrigation control valve box embedded into an earthen surface and defines an interior cavity below the earthen surface. The system further includes a removable cover adapted for installation over a top opening of the valve box and a back plate attached to an interior surface of the removable cover. The back plate includes multiple wire connectors. A bundle of wires passes into the interior cavity through a first opening in the valve box with each wire having a proximal end connected to at least one of the connectors and a distal end connected to a microcontroller remotely disposed from the valve box. Finally, the system includes individual wires, each coupled to a different one of the connectors at a proximal end and at a distal end to a respective sprinkler remotely disposed from the valve box within a sprinkler zone.

8 Claims, 3 Drawing Sheets

(51) Int. Cl.
*A01G 25/16* (2006.01)
*A01G 25/00* (2006.01)
*H01R 9/24* (2006.01)
*H01R 9/22* (2006.01)
*H02G 9/10* (2006.01)
*H02G 9/02* (2006.01)

(56) References Cited

U.S. PATENT DOCUMENTS

| | | | |
|---|---|---|---|
| 7,574,285 B2 * | 8/2009 | Kah, Jr. | A01G 25/16 700/284 |
| 7,613,546 B2 * | 11/2009 | Nelson | A01G 25/165 239/63 |
| 8,234,014 B1 * | 7/2012 | Ingle | A01G 25/165 700/284 |
| 9,301,461 B2 * | 4/2016 | Woytowitz | A01G 25/16 |
| 10,368,503 B2 * | 8/2019 | Kah, Jr. | A01G 25/16 |

* cited by examiner

IRRIGATION CONTROL WIRING SYSTEM

BACKGROUND OF THE INVENTION

Field of the Invention

The present invention relates to the field of control systems and more importantly to an irrigation control system.

Description of the Related Art

Installation techniques in the irrigation industry typically route control wires for irrigation devices such as sprinkler head valves and sensors to a box in which the wires are spliced together. For example, common installation techniques for golf course irrigation systems install device control wires for a golf hole to a valve box and use a direct bury product to splice the wires together.

Although functional, this method creates an unorganized bundle of wires that makes troubleshooting or upgrading the irrigation system extremely troublesome. Moreover, if the direct bury product is not properly sealed there is a high risk of moisture penetration, which will deteriorate the electronic signal and potentially cause complete system failure.

Post installation service on existing irrigation wiring systems is difficult because there is no way to identify which remotely located device each wire corresponds to. Consequently, a technician must undergo extensive, time-consuming testing to properly diagnose the system.

Consequently, there is need for a secure, durable, organized, and serviceable in ground irrigation control wiring system.

BRIEF SUMMARY OF THE INVENTION

Embodiments of the present technology address deficiencies of the art in respect to commercial irrigation systems such as those used to irrigate golf courses. The present technology permits ease of maintenance and troubleshooting by neatly organizing the wiring connections for an irrigation system on a board or panel disposed underneath the cover of a valve box. The placement of the connections on the back side of the cover also improves the reliability and life expectancy of the system because the connections are less susceptible to moisture penetration which could lead to corrosion and/or failed electrical connectivity. Additionally, the installation of new irrigation systems utilizing the present technology is less labor intensive and therefore less expensive and more efficient. Likewise, utilizing the present technology facilitates expansion of existing irrigation systems because the electrical signals needed to configure new sprinklers are easily accessible on the connector panel disposed on the back side of the cover.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide an irrigation control wiring system. The wiring system includes an irrigation control valve box embedded into an earthen surface, for instance that of a golf course, and defines an interior cavity below the earthen surface. The system further includes a removable cover adapted for installation over a top opening of the irrigation control valve box and a back plate attached to an interior surface of the removable cover. In this regard the back plate includes a multiplicity of wire connectors. A bundle of a multiplicity of wires passes into the interior cavity through a first opening in the valve box with each wire in the bundle having a proximal end connected to at least one of the multiplicity of wire connectors and a distal end connected to a microcontroller remotely disposed from the valve box. Finally, the system includes a set of individual wires, each coupled to a different one of the wire connectors at a proximal end and at a distal end to a respective one of a multiplicity of sprinklers remotely disposed from the valve box within a sprinkler zone. As such, each of the individual wires in the set can receive an electrical signal at a corresponding one of the connectors from a correspondingly coupled one of the multiplicity of wires in the bundle so as to cause the actuation of a respective one of the remotely disposed sprinklers in the sprinkler zone.

Figure 1:
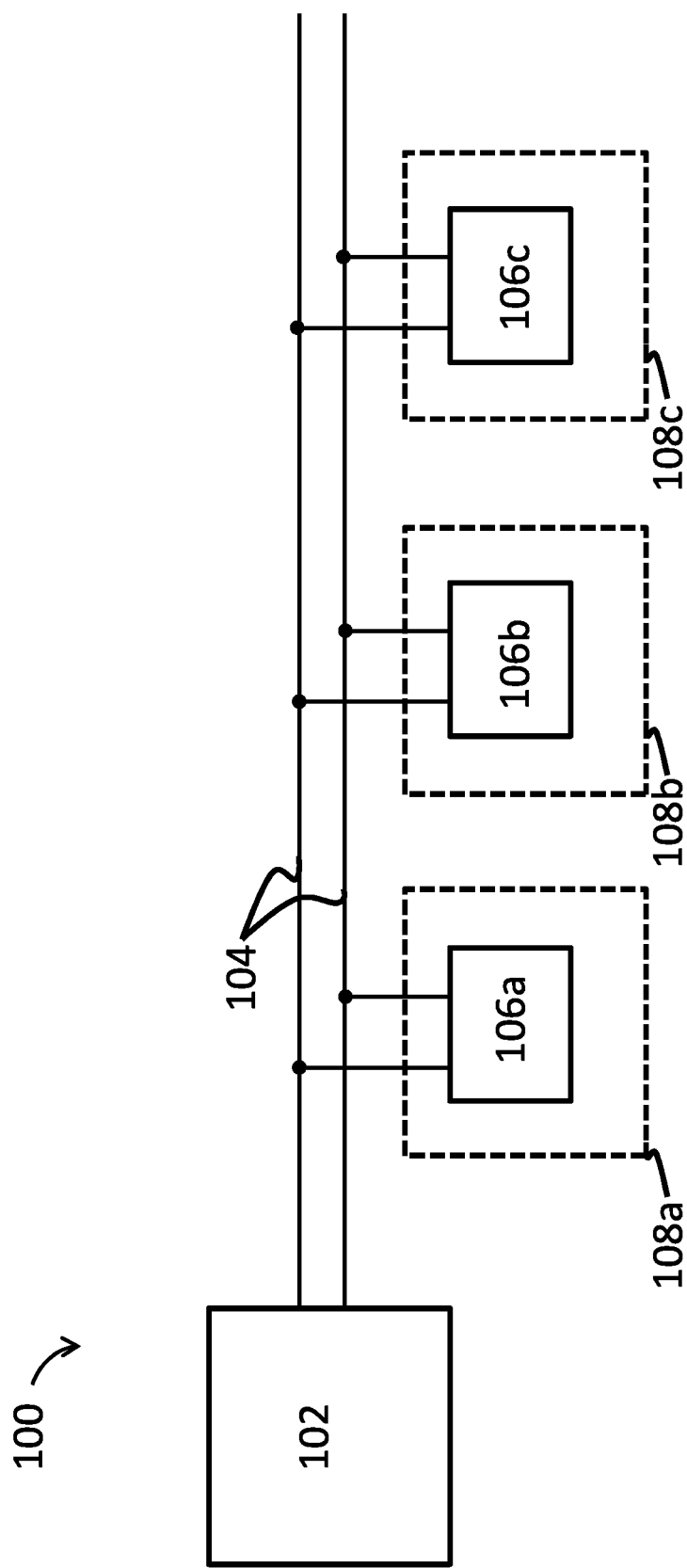
FIG. 1 is a schematic illustration of an irrigation system.

In further illustration, FIG. 1 is a block diagram of an irrigation control wiring system 100. The system 100 can include a controller unit 102 having one or more microprocessors embedded therein that can be configured to send signals via a two wire interface 104 that control one or more components within the system 100. The controller unit 102 can include various other components associated with computing devices such as a keyboard, display, power supply, memory, modem, wireless communications interface, etc.

Irrigation control wiring system 100 can include one or more irrigation zones such as zones 108a, 108b, and 108c. Each of the irrigation zones 108 can comprise components such as decoders, valves, and sprinklers. The valves may be operated magnetically, electrically, hydraulically, or pneumatically, or using combinations thereof. In some embodiments, the valves may be controlled using a solenoid.

Within each irrigation zone 108, there may be one or more control boxes 106a, 106b, and 106c. Each of the control boxes 106 can be used to make the necessary electrical connections (e.g. cable or wire splices) for controlling the irrigation equipment in the respective irrigation zone 108. As illustrated in the figures that follow, each of the control boxes 106 can have a lid or cover that is fully removable or attached to the box 106 via a hinge or some other mechanism. The lid can have disposed on its backside a board or backplane having electrical connectors that facilitate making wiring connections for the irrigation control system 100.

In some embodiments, the control boxes 106 may also be used to house one or more components of the irrigation system 100, such as the valves for the sprinklers or line decoders that receive input from controller unit 102 via the two wire interface 104. The connection panel on the back of the cover for each of the control boxes 106 can therefore facilitate all of the electrical connections needed between controller unit 102 and the components within each of the irrigation zones 108.

Figure 2:
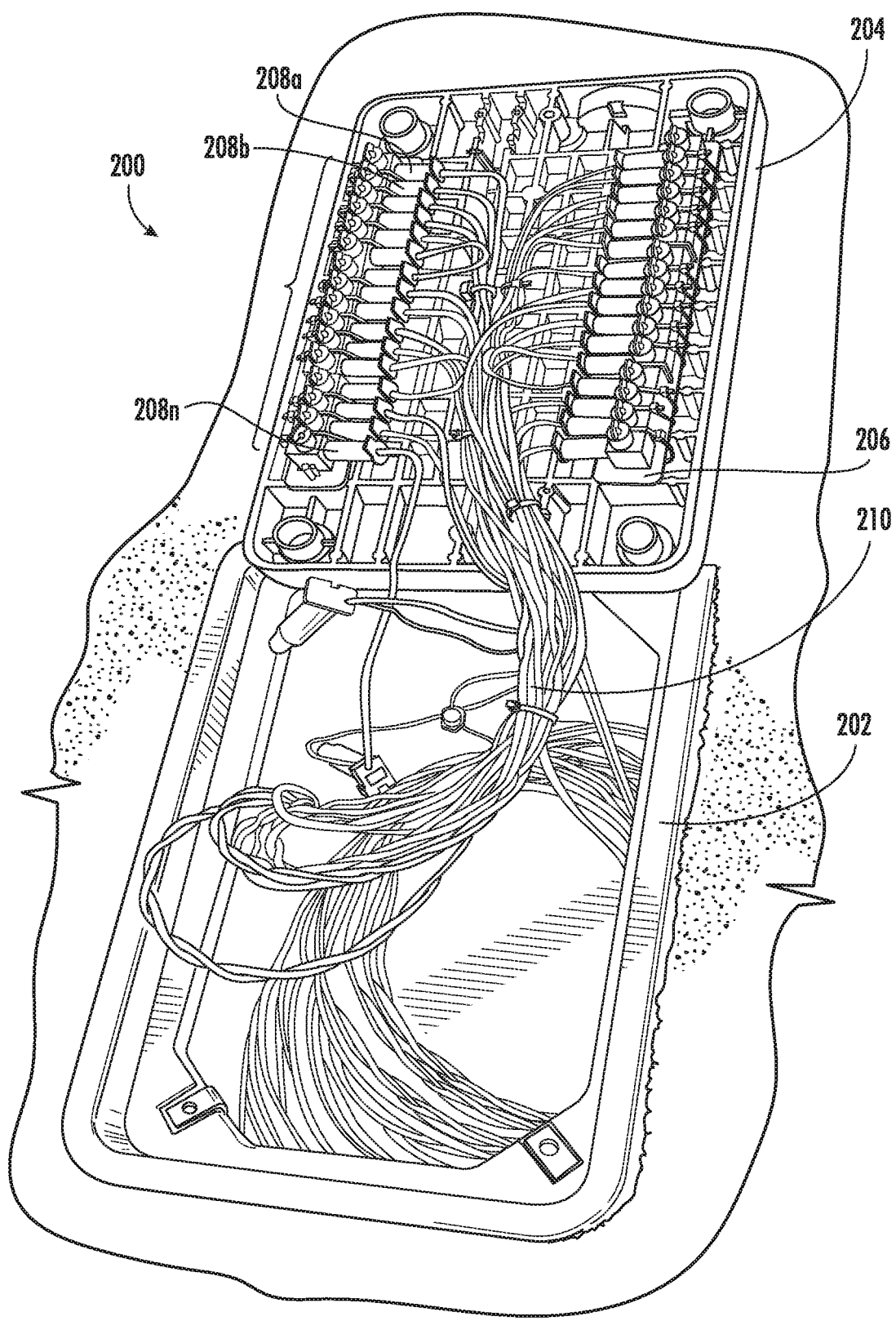
FIG. 2 is a pictorial illustration of an irrigation control valve box configured with an irrigation control wiring system.

FIG. 2 illustrates a view of a control box 200 for use with irrigation control wiring system in accordance with the present technology. The control box 200 can include a bottom enclosure 202 that is buried beneath an earthen surface and a removable cover 204. The cover 204 can include a backplane or board 206 having connectors 208a, 208b . . . 208n (collectively 208) mounted thereon. The connectors 208 can neatly facilitate making electrical connections for wires 210 without the need to splice the wires together. The wires 210 can be securely inserted to the connectors 208 in an organized fashion. The connectors 208 can provide insulation and protection from moisture. Moreover, the position of the connectors 208 on the inside of the lid can provide additional protection from moisture because water will flow down into the hole inside of enclosure 202 and away from cover 204.

In one embodiment, connectors 208 can be waterproof, santoprene coated bus bar style connectors. The connectors 208 can be configured and mounted in a format that will allow for installation in ground and can be installed by a technician onto the bottom side of lid 204. In some embodiments, connectors 208 can service lower voltage signals between 24 $V_{AC}$ and 40 $V_{AC}$. However, connectors 208 can be designed to service higher voltage signals as well.

In some embodiments, connectors 208 can be manufactured from a high strength aluminum alloy to provide premium electrical and mechanical performance, and can be rubber encapsulated with a nominal thickness of 125 mils. In some embodiments, each connector 208 can be labeled for organization or include some indicia of the corresponding signal. Each connector 208 can also include a top port that can include a mechanism for securing the wire in place such as a stainless steel hex bolt. The top port (e.g. stainless steel bolt) can also be utilized as a testing port to be used by a technician servicing the system.

Figure 3:
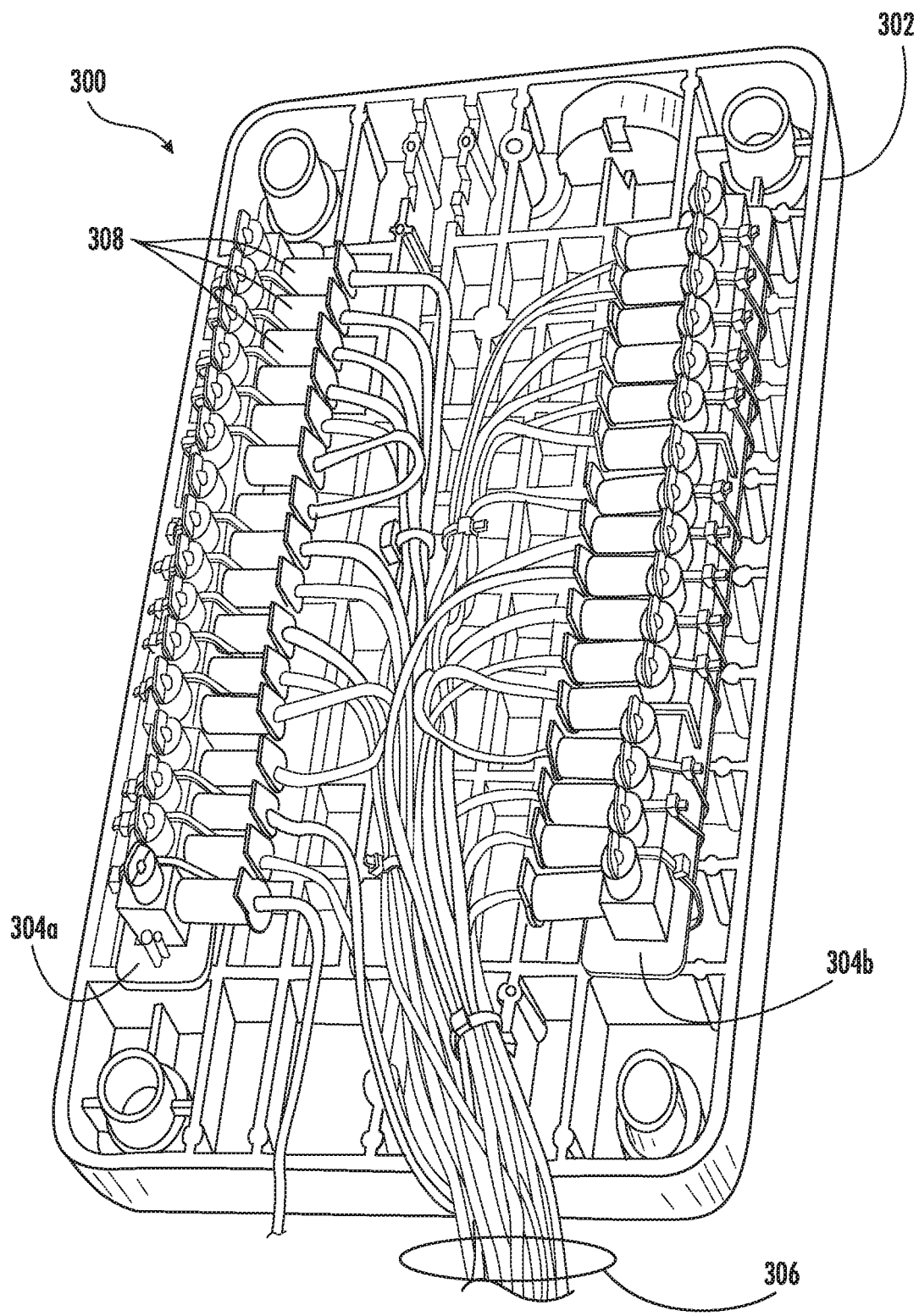
FIG. 3 is a perspective view of a cover of the irrigation control valve box of FIG. 2.

FIG. 3 illustrates a view of a control box cover 300 for an irrigation wiring control system according to the present technology. The cover 300 can include a housing 302 with one or more boards or backplanes 304a, 304b mounted on its inside surface. The board 304 can have one or more connectors 308 mounted thereon suitable for receiving wires 306 for an irrigation control system. In some embodiments, the connectors 308 can be arranged in a bus or bar configuration wherein multiple connectors are formed together and can permit an electrical connection between the wires inserted in adjacent connectors. In some embodiments, the housing 302, the backplane 304, and the connectors 308 can be separate components. Alternatively, two or more of these components can be formed together as a single component.

The above detailed description is intended to highlight various features and aspects of the invention by discussing specific attributes of particular embodiments of the invention. Persons of ordinary skill in the art will recognize that various changes can be made to the described embodiments without departing from the scope of the invention. All such modifications are intended to be within the scope and spirit of the apparatuses, systems and methods described herein.

As well, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Finally, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. An irrigation control wiring system comprising:
   an irrigation control valve box embedded into an earthen surface and defining an interior cavity below the earthen surface;
   a removable cover adapted for installation over a top opening of the irrigation control valve box;
   a back plate attached to an interior surface of the removable cover, the back plate comprising a multiplicity of wire connectors;
   a bundle of a multiplicity of wires passing into the interior cavity through a first opening in the valve box, each wire in the bundle having a proximal end connected to at least one of the multiplicity of wire connectors and a distal end connected to a microcontroller remotely disposed from the valve box, and,
   a set of individual wires, each coupled to a different one of the wire connectors at a proximal end and at a distal end to a respective one of a multiplicity of sprinklers remotely disposed from the valve box within a sprinkler zone;
   wherein each of the individual wires in the set receives an electrical signal at a corresponding one of the connectors from a correspondingly coupled one of the multiplicity of wires in the bundle causing an actuation of a respective one of the remotely disposed sprinklers in the sprinkler zone.

2. The irrigation control wiring system of claim 1, wherein the removable cover and the back plate are formed as a single component.

3. The irrigation control wiring system of claim 1, wherein the multiplicity of wire connectors comprises a bus bar arrangement.

4. The irrigation control wiring system of claim 1, wherein the multiplicity of wire connectors is enveloped by a water proof material.

5. The irrigation control wiring system of claim 1, wherein the multiplicity of wire connectors is formed from an aluminum alloy material.

6. The irrigation control wiring system of claim 1, wherein electrical signal has a maximum voltage of forty volts.

7. The irrigation control wiring system of claim 1, wherein each connector of the multiplicity of wire connectors comprises both a wire insertion port and also a testing port.

8. A golf course irrigation system comprising:
- a set of different groupings of sprinklers, each grouping comprising at least one sprinkler and each grouping disposed in a different geographic zone of a golf course;
- a set of irrigation valve control boxes, each of the irrigation valve control boxes corresponding to a different one of the groupings of sprinklers; and,
- a water source coupled to each of the sprinklers in each zone of the golf course, the water source providing a flow of water to each of the sprinklers on demand responsive to a remote actuation of each of the sprinklers by a microcontroller;
- each of the valve control boxes being embedded into an earthen surface of the golf course defining an interior cavity below the earthen surface and each of the valve control boxes comprising:
  - a removable cover adapted for installation over a top opening of the valve control box;
  - a back plate attached to an interior surface of the removable cover, the back plate comprising a multiplicity of wire connectors;
  - a bundle of a multiplicity of wires passing into the interior cavity through a first opening in the valve box, each wire in the bundle having a proximal end connected to at least one of the multiplicity of wire connectors and a distal end connected to the microcontroller, and,
  - a set of individual wires, each coupled to a different one of the wire connectors at a proximal end and at a distal end to a respective one of the sprinklers;
  - wherein each of the individual wires in the set receives an electrical signal at a corresponding one of the connectors from a correspondingly coupled one of the multiplicity of wires in the bundle causing an actuation of a respective one of the sprinklers.

* * * * *